United States Patent Office 3,696,066
Patented Oct. 3, 1972

---

3,696,066
PLASTICIZED COMPOSITIONS
Ross E. Morris, Vallejo, Calif., assignor to the United States of America as represented by the Secretary of the Navy
No Drawing. Continuation-in-part of application Ser. No. 822,696, May 7, 1969. This application Jan. 8, 1971, Ser. No. 105,131
Int. Cl. C08c *11/66, 11/72;* C08d *11/02*
U.S. Cl. 260—23.7 H        3 Claims

ABSTRACT OF THE DISCLOSURE

A rubber having a plasticizer that exceeds the solubility limit of the plasticizer in the rubber. The plasticizer is selected so that it will plasticize the paint and since it exceeds the solubility limit of the plasticizer in the rubber, it will gradually migrate to the surface of the rubber and act as a softening agent for the paint and maintain the paint in a soft or unhardened condition.

---

The invention described herein may be manufactured and used by or for the Government of the United States of America for governmental purposes without the payment of any royalties thereon or therefor.

This patent application is a continuation-in-part of patent application S.N. 822,696, entitled Plasticized Compositions, filed May 7, 1969, now abandoned, by Ross E. Morris.

The present invention relates to plasticized compositions and more particularly to plasticized rubbers where the amount of plasticizer added to the rubber exceeds the solubility limit of the plasticizer in the rubber.

One of the sources of noise emanating from submarines is fluid noises in shipboard pipe lines and the flexual vibrations of these pipes. The noise transmission path from these pipes to the submarine walls is through the pipe hangers. One type of pipe hanger that is in general use on submarines employs resilient or rubber channels or blocks to isolate and prevent the transmission of noise from the pipes to the submarine walls. In a single submarine there may be several thousand pipe hangers of the type described. In painting the interior of a submarine many of the pipe hangers become painted and it has been found that the hardened paint that coats the rubber isolators increases their mechanical impedance and consequently increases the transmission of noise and vibrations from the pipes to the ship's hull.

The methods previously used to overcome this problem were to cover the rubber isolators with masking tape before painting and remove the tape plus paint layer afterwards, or to coat the rubber isolators with a release film such as soap which will enable the dried paint film to be scraped off. Both methods increase the cost of painting since they require two extra operations. Often, due to negligence of workman or inaccessibility, the dried paint film and masking tape, or the dried paint film over the release agent, are not removed, so excess noise and vibration are transmitted to the ship's hull by the stiffened isolator.

The present invention overcomes these problems by utilizing unique rubber compounds in the isolators. Paint layers applied to these rubber compounds never harden; therefore, there is no increase in the mechanical impedance of the isolators and consequently no increase in the transmission of sound or vibration. In accordance with the present invention, this is achieved by incorporating a plasticizer in the rubber that exceeds the solubility limit of the plasticizer in the rubber. The plasticizer is selected so that it will plasticize the paint and since it exceeds the solubility limit of the plasticizer in the rubber, it will gradually migrate to the surface of the rubber and act as a softening agent for the paint and maintain the paint in a soft or unhardened condition.

Accordingly, an object of the present invention is to provide a rubber material that prevents paint from hardening on the surface thereof.

Other objects and many of the attendant advantages of this invention will be appreciated by reference to the following detailed description.

The basic rubber composition of the present invention comprises a rubber composition, synthetic or natural, which has a plasticizer incorporated therein where the amount of plasticize exceeds the solubility limit of the plasticizer so that it will gradually migrate out to the surface of the rubber and act as a softening agent for paint that is coating the surface of the rubber.

Among suitable resilient materials are natural and synthetic rubbers. Some of the synthetic rubbers are the following: styrene-butadiene, acrylonitrile-butadiene, isoprene, butadiene, isoprene-isobutylene, chlorosulfonated polyethylene, epichlorohydrin, fluorocarbon (not oven cured), silicone (not oven cured), Thiokol, ethylene-propylene, ethylene-propylene terpolymer wherein the terpolymer is a sulfur curable terpolymer of ethylene, propylene and a non-conjugated diene in the weight proportions of about 54%, 44% and 2% respectively, and chloroprene.

Among suitable plasticizers are the following: tri-octyl phosphate, tri-butoxy ethyl phosphate, tri-cresyl phosphate, dibutyl phthalate, dioctyl phthalate, dibutyl sebacate and dibutyl azelate.

Among suitable paints are the following: vinyl base, alkyl base, chlorinated alkyl base and acrylic latex base.

The basic requirements of the rubber compound of the present invention are that the amount of the selected plasticizer that is added to the selected rubber exceeds the solubility limit of the particular plasticizer in the particular rubber so that the plasticizer will migrate from the interior to the surface of the rubber. It should be noted that the solubilities of ester-type plasticizers in certain rubbers, such as acrylonitrile-butadiene, epichlorohydrin, fluorocarbon and chloroprene may be quite high, and it is necessary to add considerable plasticizers to exceed its solubility limit. While an effective rubber compound in accordance with the present invention may be made from these crude synthetic rubbers, it is preferred that a crude rubber be used in which the plasticizers are less soluble. This is because an excessive amount of plasticizer may diminish some of the other desirable characteristics of the rubber such as strength and resistance to creep under load.

Typical examples of rubber formulations made in accordance with the present invention are given below:

EXAMPLE I (Chlorobutyl rubber)

| | |
|---|---|
| Chlorobutyl rubber (HT 10–66) | 100 |
| Carbon black (statex RH) | 65 |
| Zinc oxide (protox 166) | 5 |
| Stearic acid | 1 |
| Phenyl beta naphthylamine (neozone D) | 1 |
| Trioctyl phosphate (Flexol TOF) | 10 |
| Zinc diethyl dithiocarbomate (ethyl zimate) | 2 |

The numbers indicate the parts by weight. The chlorobutyl rubber has a chlorine content of about 1.2% by weight. Protex 166 and stearic acid function as activators for the vulcanization, Neozone D functions as an antioxidant, Flexol TOF is the plasticizer and the Ethyl Zimate functions as an accelerator for the vulcanization process. Example I was cured for 40 minutes at 310° F.

and yielded a rubber having nominally 60 Shore A hardness, and the plasticizer migrated to the rubber surface and softened the paint coating the rubber surface. Warmed blocks of this rubber were cleanly punched for pipe and bolt holes and had high vibration damping characteristics. The specified amount of the plasticizer, Flexol TOF, was greater than the solubility limit of the rubber and larger amounts of the plasticizer Flexol TOF may be used to achieve a faster and greater plasticizer migration.

EXAMPLE II (Styrene-butadiene rubber)

| | |
|---|---|
| Styrene-butadiene rubber (Synpol 1500) | 100 |
| Carbon black (Philblack A) | 45 |
| Carbon black (Statex B) | 45 |
| Zinc oxide (Protox 166) | 5 |
| Wax (Heliozone) | 3 |
| Tributoxy ethyl phosphate (KP-140) | 25 |
| Tetramethyl thiuram monosulfide (Thionex) | 0.4 |
| Sulfur | 2 |

The numbers indicate the parts by weight. The styrene-butadiene has a styrene content of about 23% by weight. Protox 166 functions as an activator of vulcanization, Heliozone protects the rubber from atmospheric ozone, Thionex functions as an accelerator of vulcanization, and sulfur is the vulcanizing agent. Example II was cured for 35 minutes at 310° F. and yielded a rubber having nominally 60 Shore A hardness, and the plasticizer migrated to the rubber surface and softened the paint coating the rubber surface. Warmed blocks of this rubber were cleanly punched for pipe and bolt holes and had medium damping characteristics. The specified amount of the plasticizer KP-140 was greater than the solubility limit of the rubber and larger amounts of the plasticizer may be used to achieve a faster and greater plasticizer migration.

EXAMPLE III (Natural rubber)

| | |
|---|---|
| Natural rubber (smoked sheet) | 100 |
| Calcium carbonate (Atomite) | 135 |
| Carbon black (Thermax) | 90 |
| Zinc oxide (Protox 166) | 5 |
| Stearic acid | 1 |
| Wax (Heliozone) | 3 |
| Phenyl beta naphthylamine (Neozone D) | 1 |
| N-isopropyl-N'-phenyl-p-phenylene diamine (Flexzone 3-C) | 4 |
| Tributoxy ethyl phosphate (KP-140) | 10 |
| Dibenzothiazyl disulfide (Altax) | 1 |
| Tetramethyl thiuram monosulfide (Thionex) | 0.3 |
| Sulfur | 1.5 |

The numbers indicate the parts by weight. Atomite and Thermax are fillers; Protox 166 and stearic acid function as activators for the vulcanization process, Heliozone and Flexzone 3-C protect the rubber from atmospheric ozone, Neozone D is an antioxidant, KP-140 is the plasticizer, Altax and Thionex are accelerators of vulcanization, and sulfur is the curing agent. Example III was cured for 30 minutes at 310° F. and yielded a rubber having nominally 60 Shore A hardness, and the plasticizer migrated to the rubber surface and softened the paint coating the rubber surface. Warmed blocks of this rubber were cleanly punched for pipe and bolt holes and had low vibration damping characteristics. The specified amount of the plasticizer KP-140 was greater than its solubility in the rubber, but larger amounts of the plasticizer may be used to achieve a faster and greater plasticizer migration.

What is claimed is:

1. A composition comprising a rubber and a plasticizer, said plasticizer being present in said rubber by an amount that exceeds the solubility limit of said plasticizer in said rubber, said rubber comprising the following:
   (a) about 100 parts by weight chlorobutyl rubber having a chlorine content of about 1.2% by weight, about 65 parts by weight carbon black, about 5 parts by weight zinc oxide, about 1 part by weight stearic acid, about 1 part weight phenyl beta naphthylamine, about 10 parts by weight trioctyl phosphate, and about 2 parts by weight zinc diethyl dithiocarbomate.

2. A composition comprising a rubber and a plasticizer, said plasticizer being present in said rubber by an amount that exceeds the solubility limit of said plasticizer in said rubber, said rubber comprising the following:
   (a) about 100 parts by weight of styrene-butadiene rubber having a styrene content of about 23% by weight, about 90 parts by weight of carbon black, about 5 parts by weight of zinc oxide, about 3 parts by weight of wax, about 25 parts by weight of tributoxy ethyl phosphate, about 0.4 part by weight of tetramethyl thiuram monosulfide, about 2 parts by weight of sulfur.

3. A composition comprising a rubber and a plasticizer, said plasticizer being present in said rubber by an amount that exceeds the solubility limit of said plasticizer in said rubber, said rubber comprising the following:
   (a) about 100 parts by weight of natural rubber, about 135 parts by weight of calcium carbonate, about 90 parts by weight of carbon black, about 5 parts by weight of zinc oxide, about 1 part by weight of stearic acid, about 1 part by weight of wax, about 1 part by weight of phenyl beta naphthylamine, about 4 parts by weight of N-isopropyl-N'-phenyl-p-phenylene diamine, about 10 parts by weight of tributoxy ethyl phosphate, about 1 part by weight of dibenzothiazyl disulfide, about 0.3 part by weight of tetramethyl thiuram monosulfide, and about 1.5 parts by weight of sulfur.

References Cited

UNITED STATES PATENTS

| | | | |
|---|---|---|---|
| 2,984,640 | 5/1961 | Kaplan | 260—33.4 |
| 3,274,148 | 9/1966 | Sparks et al. | 260—41.5 |
| 2,325,979 | 8/1943 | Sarbach | 260—30.6 |

OTHER REFERENCES

Kirk-Othmer, Encyclopedia of Chemical Technology, vol. 15, 1968.

Woodcock W. A., In Rubber Age, April 1951, pp. 51–53.

MORRIS LIEBMAN, Primary Examiner

J. H. DERRINGTON, Assistant Examiner

U.S. Cl. X.R.

260—23.7 R, 30.6 R, 30.6 SB, 31.8 R, 31.8 S, 31.8 E, 31.8 Z, 31.8 DR, 31.8 F, 31.8 PQ, 752, 761